(12) United States Patent
Merrifield, Jr. et al.

(10) Patent No.: US 8,271,319 B2
(45) Date of Patent: Sep. 18, 2012

(54) STRUCTURED IMPLEMENTATION OF BUSINESS ADAPTABILITY CHANGES

(75) Inventors: Eric S. Merrifield, Jr., Seattle, WA (US); Chad K. Corneil, Snoqualmie, WA (US)

(73) Assignee: Microsoft Corporation, Redmond, WA (US)

( * ) Notice: Subject to any disclaimer, the term of this patent is extended or adjusted under 35 U.S.C. 154(b) by 759 days.

(21) Appl. No.: 12/187,257

(22) Filed: Aug. 6, 2008

(65) Prior Publication Data

US 2010/0036699 A1   Feb. 11, 2010

(51) Int. Cl.
G06Q 10/00   (2006.01)
(52) U.S. Cl. ................................. 705/7.37; 705/7.38
(58) Field of Classification Search .............. 705/7.38, 705/7.39
See application file for complete search history.

(56) References Cited

U.S. PATENT DOCUMENTS

| | | | |
|---|---|---|---|
| 5,233,513 A | 8/1993 | Doyle | |
| 5,799,286 A | 8/1998 | Morgan | |
| 5,953,707 A * | 9/1999 | Huang et al. ................. | 705/7.25 |
| 6,151,582 A | 11/2000 | Huang | |
| 6,321,205 B1 | 11/2001 | Eder | |
| 6,345,239 B1 | 2/2002 | Bowman-Amuah | |
| 6,560,569 B1 | 5/2003 | Abu El Ata | |
| 6,601,233 B1 | 7/2003 | Underwood | |
| 6,609,120 B1 | 8/2003 | Honarvar | |
| 6,772,216 B1 | 8/2004 | Ankireddipally | |
| 6,778,971 B1 | 8/2004 | Altschuler | |
| 6,873,979 B2 | 3/2005 | Fishman | |
| 6,898,783 B1 | 5/2005 | Gupta | |
| 6,904,449 B1 | 6/2005 | Quinones | |
| 6,961,756 B1 | 11/2005 | Dilsaver | |
| 6,965,886 B2 | 11/2005 | Gorvin | |
| 7,043,454 B2 | 5/2006 | Powell | |
| 7,120,896 B2 | 10/2006 | Budhiraja | |
| 7,162,427 B1 | 1/2007 | Myrick | |
| 7,243,120 B2 | 7/2007 | Massey | |
| 7,246,144 B2 | 7/2007 | Walsh | |
| 7,251,613 B2 | 7/2007 | Flores | |

(Continued)

FOREIGN PATENT DOCUMENTS

WO   00/42553   7/2000

(Continued)

OTHER PUBLICATIONS

Wilmot, Foreign Keys Decrease Adaptability of database designs, Comm. ACM, Dec. 1984, vol. 27, No. 12, pp. 1237-1243.*

(Continued)

*Primary Examiner* — Justin M Pats
*Assistant Examiner* — Ivan R Goldberg
(74) *Attorney, Agent, or Firm* — Workman Nydegger

(57) ABSTRACT

The present invention extends to methods, systems, and computer program products for structured implementation of business adaptability changes. In some embodiments, a pre-defined resource vocabulary is utilized to assist a decision making entity in selecting an appropriate response to a change trigger event. The pre-defined resource vocabulary provides a mechanism for a plurality of different organizations to consider resource selection for responding to change trigger events in a uniform, repeatable, and consistent manner so as to increase decision agility. In other embodiments, a pre-defined common vocabulary defines a range of business adaptability. The pre-defined common vocabulary provides a mechanism for a plurality of different organizations to consider changes in business adaptability in a uniform manner and provides a mechanism to produce consistent repeatable results for considered changes in business adaptability.

14 Claims, 10 Drawing Sheets

U.S. PATENT DOCUMENTS

| | | |
|---|---|---|
| 7,281,235 B2 | 10/2007 | Datta |
| 7,308,414 B2 | 12/2007 | Parker |
| 7,308,417 B1 | 12/2007 | Nathan |
| 7,461,038 B2 | 12/2008 | Kropaczek et al. |
| 7,506,302 B2 | 3/2009 | Bahrami |
| 7,580,913 B2 | 8/2009 | Chandra et al. |
| 7,703,071 B2 | 4/2010 | Kuester |
| 2001/0053991 A1 | 12/2001 | Bonabeau |
| 2002/0013720 A1 | 1/2002 | Ozono |
| 2002/0049573 A1 | 4/2002 | El Ata |
| 2002/0059264 A1 | 5/2002 | Fleming |
| 2002/0095393 A1 | 7/2002 | McHaney |
| 2002/0103869 A1 | 8/2002 | Goatly |
| 2002/0133368 A1 | 9/2002 | Strutt |
| 2002/0138484 A1 | 9/2002 | Bialek |
| 2002/0186238 A1 | 12/2002 | Sylor |
| 2002/0198722 A1 | 12/2002 | Yuschik |
| 2002/0198727 A1 | 12/2002 | Ann |
| 2002/0198800 A1 | 12/2002 | Shamrakov |
| 2003/0033182 A1 | 2/2003 | Stok |
| 2003/0046123 A1 | 3/2003 | Chen |
| 2003/0065690 A1 | 4/2003 | Kelley |
| 2003/0084053 A1 | 5/2003 | Govrin |
| 2003/0216955 A1 | 11/2003 | Miller |
| 2004/0034496 A1 | 2/2004 | Correll |
| 2004/0034615 A1 | 2/2004 | Thomson et al. |
| 2004/0054690 A1* | 3/2004 | Hillerbrand et al. ....... 707/104.1 |
| 2004/0068431 A1 | 4/2004 | Smith |
| 2004/0138933 A1* | 7/2004 | LaComb et al. ................ 705/7 |
| 2004/0143470 A1 | 7/2004 | Myrick |
| 2004/0153436 A1 | 8/2004 | Pope |
| 2004/0172319 A1 | 9/2004 | Eder |
| 2004/0177326 A1 | 9/2004 | Bibko |
| 2004/0181538 A1 | 9/2004 | Lo |
| 2004/0230404 A1 | 11/2004 | Messmer |
| 2004/0236618 A1 | 11/2004 | Smith |
| 2004/0243595 A1* | 12/2004 | Cui et al. .................. 707/100 |
| 2005/0021348 A1* | 1/2005 | Chan et al. .................. 705/1 |
| 2005/0021433 A1 | 1/2005 | Hyler |
| 2005/0027752 A1 | 2/2005 | Gelbard |
| 2005/0033716 A1 | 2/2005 | Ambroz |
| 2005/0033762 A1* | 2/2005 | Kasravi et al. ............... 707/102 |
| 2005/0043977 A1 | 2/2005 | Ahern |
| 2005/0049882 A1 | 3/2005 | Sawka |
| 2005/0065805 A1* | 3/2005 | Moharram .................. 705/1 |
| 2005/0071737 A1 | 3/2005 | Adendorff |
| 2005/0075914 A1 | 4/2005 | Bayne |
| 2005/0086189 A1* | 4/2005 | Noble .................... 705/1 |
| 2005/0091093 A1 | 4/2005 | Bhaskaran |
| 2005/0108022 A1 | 5/2005 | Bhattacharya |
| 2005/0149558 A1 | 7/2005 | Zhuk |
| 2005/0197969 A1 | 9/2005 | McElroy |
| 2005/0216320 A1 | 9/2005 | Hattaway |
| 2005/0222893 A1* | 10/2005 | Kasravi et al. ................ 705/10 |
| 2006/0005157 A1 | 1/2006 | Saxena |
| 2006/0064335 A1 | 3/2006 | Goldszmidt |
| 2006/0074833 A1 | 4/2006 | Gardner |
| 2006/0111921 A1 | 5/2006 | Chang et al. |
| 2006/0116919 A1 | 6/2006 | Homann |
| 2006/0116922 A1 | 6/2006 | Homann |
| 2006/0149764 A1* | 7/2006 | Burchfield et al. ........... 707/101 |
| 2006/0167665 A1 | 7/2006 | Ata |
| 2006/0167704 A1* | 7/2006 | Nicholls et al. .............. 705/1 |
| 2006/0178928 A1 | 8/2006 | Carney |
| 2006/0206374 A1 | 9/2006 | Asthana |
| 2006/0224425 A1 | 10/2006 | Homann |
| 2006/0229922 A1 | 10/2006 | Levy |
| 2006/0229926 A1 | 10/2006 | Homann |
| 2006/0235732 A1 | 10/2006 | Miller et al. |
| 2006/0241954 A1* | 10/2006 | Jeng et al. ................ 705/1 |
| 2006/0241956 A1 | 10/2006 | Levy |
| 2006/0242176 A1 | 10/2006 | Tsyganskiy |
| 2006/0247943 A1 | 11/2006 | Kapoor |
| 2006/0277156 A1 | 12/2006 | Merican |
| 2006/0293911 A1 | 12/2006 | Wittmann |
| 2007/0016886 A1 | 1/2007 | O'Neill |
| 2007/0021992 A1 | 1/2007 | Konakalla |
| 2007/0022404 A1 | 1/2007 | Zhang |
| 2007/0043724 A1 | 2/2007 | Senan |
| 2007/0067195 A1 | 3/2007 | Fahner et al. |
| 2007/0078702 A1 | 4/2007 | Tandon |
| 2007/0094288 A1 | 4/2007 | Enenkiel |
| 2007/0124184 A1 | 5/2007 | Schmit et al. |
| 2007/0143174 A1 | 6/2007 | Tien |
| 2007/0162496 A1 | 7/2007 | Pulfer |
| 2007/0174109 A1 | 7/2007 | Cohn |
| 2007/0174840 A1* | 7/2007 | Sharma et al. ................ 718/104 |
| 2007/0203589 A1 | 8/2007 | Flinn |
| 2007/0203718 A1 | 8/2007 | Merrifield, Jr. |
| 2007/0203766 A1 | 8/2007 | Adler |
| 2007/0234277 A1 | 10/2007 | Lei |
| 2007/0250361 A1 | 10/2007 | Hazy |
| 2008/0004924 A1 | 1/2008 | Cao |
| 2008/0120573 A1 | 5/2008 | Gilbert |
| 2008/0270448 A1 | 10/2008 | Brennan et al. |
| 2008/0313102 A1 | 12/2008 | Campo |
| 2009/0112655 A1 | 4/2009 | Stuhec |
| 2009/0158237 A1 | 6/2009 | Zhang et al. |

FOREIGN PATENT DOCUMENTS

| | | |
|---|---|---|
| WO | 01/06352 | 1/2001 |

OTHER PUBLICATIONS

Mathiassen, "Business agility and diffusion of information technology," 2006, European Journal of Information Systems, vol. 15, pp. 116-119.*

Plachy, "Enterprise Solutions Structure," 1999, IBM Systems Journal, vol. 38, No. 1, pp. 4-10.*

Noble, "Agile Application-Aware Adaptation for Mobility," Oct. 1997, Proc. 16th ACM Symposium, Op. Sys. Principles.*

Swafford, "A framework for assessing value chain agility," 2006, International Journal of Operations & Production Management, vol. 26, pp. 118-140.*

U.S. Appl. No. 11/361,199, filed Oct. 12, 2010, Office Action.

Office Action dated Feb. 3, 2009 cited in U.S. Appl. No. 11/230,206.

Office Action dated Mar. 5, 2009 cited in U.S. Appl. No. 11/076,142.

Office Action dated Mar. 5, 2009 cited in U.S. Appl. No. 10/999,852.

IBM, "Impacting Business Agility with SOA: highlights of IBM's recent announcements", IBM Impact 2007, 4 pages.

Taylor, James, "Is Business Agility an Oxymoron?" Oct. 4, 2004, 2 pages.

Computacenter Services, "Outsourcing Enhances Business Agility" 2007, 2 pages.

Palmer, Mark, "Event stream processing & business agility", Feb. 16, 2006, 4 pages.

U.S. Appl. No. 12/202,920, filed Sep. 2, 2008, Merrifield.

U.S. Appl. No. 12/206,589, filed Sep. 8, 2008, Merrifield.

U.S. Appl. No. 12/242,430, filed Sep. 30, 2008, Merrifield.

U.S. Appl. No. 12/323,086, filed Nov. 25, 2008, Merrifield.

U.S. Appl. No. 12/242,412, filed Sep. 30, 2008, Merrifield.

IBM, "Orchestrating Brilliance Managing Innovation in an On-Demand World", Based on Information and belief available, at least as early as Nov. 2, 2007, 3 Pages.

Matheson, Lona, "Identifying the Strategic Opportunities of E-Business Innovation", Aug. 2006, 3 Pages.

Business Victoria—Managing & Improving Your Business—Innovation, Based on Information and belief available, at least as early as Nov. 2, 2007, 3 Pages.

Shemi, Arvindra et al., "Service Oriented Modeling for Connected Systems", Architecture Journal, 2006, Journal 7, 26 pages.

Malhotra, Yogesh, "Integrating Knowledge Management Technologies in Organizational Business Processes: Getting Real Time Enterprises to Deliver Real Business Performance", vol. 9, No. 1, 2005, pp. 7-28, Emerald Group Publishing Limited, Journal of Knowledge Management.

Garnder, Jay M., "Building Business Value Faster with Manage Services", 2005 BMC Software Inc., 8 Pages.

InfoSys Technologies Limited, "Enterprise Performance Management Solution", 2007, 1 Page.

Navigation Views, "Key Performance Indicators View", Based on Information and Belief Available, at least as early as Nov. 20, 2007, 1 page.

Medicke, John, et al., "Manage Business Performance, Part 2: Retail Scenarios and Business Performance Management Architecture", Jun. 1, 2004, 9 Pages.

Ing. M.G. (Rine) le Comte BSc., "Business Processes and Workflow Management in an Enterprise Resource Planning Content", OOPSLA 1997, Atlanta, Business Object Workshop III, 5 Pages.

Nayak, N., et al., IBM Systems Journal, "Core Business Architecture for a Service-Oriented Enterprise", Accepted for Publication Jun. 12, 2007; Published Online Sep. 27, 2007, 17 Pages.

Deloitte, "Service-Enabled Enterprise Resource Planning: Challenging the Boundaries of Traditional Packaged Application to Deliver Business Value", 2006, 11 Pages.

Franke, Jochen, et al., "Bridging the Gap: Linking IT-Infrastructure and Business Processes", 2004, 8 Pages.

Homann, Ulrich, "A Business-Oriented Foundation for Service Orientation", Feb. 2006, 9 Pages.

Merrifield, Ric and Tobey, Jon; "Motion Lite: A rapid Application of the Business Architecture Techniques Used by Microsoft Motion", May 2006, 20 Pages.

Starta Development Inc. "The Tools You Need: Business Innovations" Printed from http://www.startadevelopment.com/r.sh?content=BusinessInnovations on Nov. 7, 2007; 5 Pages.

Nagumo, Toshida; "Innovative Business Models in the Era of Ubiquitous Networks" NPL Papers No. 49, Jun. 1, 2002, Copyright 2002 by Nomura Research Institute, Ltd.

Li, Hua Huang and Yu, Yang Cai; " Organization and Management Innovation", (Dept. of Information Management and Information Systems, Research Center of E-Business, School of Management, Fudan University, Shanghai 200433) Printed Nov. 7, 2007.

Office Action dated Nov. 18, 2009 cited in U.S. Appl. No. 10/999,852.

Office Action dated Nov. 17, 2009 cited in U.S. Appl. No. 11/076,142.

Office Action dated Jan. 13, 2010 cited in U.S. Appl. No. 11/361,199.

Office Action dated May 28, 2009 cited in U.S. Appl. No. 11/094,926.

Office Action dated Jun. 25, 2009 cited in U.S. Appl. No. 11/112,777.

Office Action dated Sep. 17, 2009 cited in U.S. Appl. No. 11/230,206.

Office Action dated Oct. 2, 2009 cited in U.S. Appl. No. 11/094,988.

U.S. Appl. No. 12/323,086, filed Jul. 5, 2011, Office Action.

U.S. Appl. No. 12/242,430, filed May 9, 2011, Office Action.

Kotelnikov, Vadim; "Business Innovation: Reinventing Your Business and Competitive Rules" Printed from http://www.1000ventures.com/business_guide/innovation_business.html, retrieved on Nov. 7, 2007.

Office Action dated Nov. 10, 2008 cited in U.S. Appl. No. 11/094,926.

Office Action dated Sep. 1, 2011 cited in U.S. Appl. No. 12/202,920.

Office Action dated Sep. 6, 2011 cited in U.S. Appl. No. 12/242,412.

Notice of Allowance dated in Sep. 7, 2011 cited in U.S. Appl. No. 12/242,430.

Office Action dated Oct. 12, 2011 cited in U.S. Appl. No. 11/361,199.

Office Action dated Oct. 7, 2011 cited in U.S. Appl. No. 12/206,589.

Office Action dated Oct. 25, 2011 cited in U.S. Appl. No. 12/323,086.

Notice of Allowance dated in Dec. 1, 2011 cited in U.S. Appl. No. 12/242,430.

Notice of Allowance mailed Feb. 6, 2012 cited in U.S. Appl. No. 12/206,589.

Office Action dated Apr. 9, 2012 cited in U.S. Appl. No. 12/242,412.

Office Action dated Apr. 11, 2012 cited in U.S. Appl. No. 12/202,920.

* cited by examiner

STRUCTURED IMPLEMENTATION OF BUSINESS ADAPTABILITY CHANGES

CROSS-REFERENCE TO RELATED APPLICATIONS

Not Applicable.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many business related processes are distributed across a number of different computer systems and/or a number of different computing components.

The ability of an organization to change its processes is important to staying competitive in a given field. The need for change is often identified as a result of some detected internal or external event, such as, example, under performing or over performing business units, new competing products, regulatory changes, etc. In many organizations, events are not explicitly defined. On the other hand, there is a subjective "I will know it when I see it" approach.

Prior to maturity of the Internet, a decision maker would look essentially solely inside the organization for available resources (e.g., at available people, processes, technology, and governance) with an eye on time, agility, and financial constraints, when determining how to respond to an event. The inside only view offered a decision-maker a small list of actionable alternatives, and the best alternative was often obvious and because there were so few options, the risk associated with choosing the wrong alternative was low. Additionally, the pace of many businesses was slower prior to the developed Internet. Thus, a decision-maker could fail in the initial response to the event, and have time to try again. Accordingly, a wrong alternative could often be corrected prior to realizing negative impacts of the wrong alternative.

However, as the Internet (and interconnectivity between organizations in general) matures, the pace of business and available alternatives to responding to an event continue to increase. Through outsourcing, on-demand services, open source, etc., decisions makers have significantly more alternatives to choose from when responding to an event. Decision-makers have alternatives that are starting to seem infinite in terms of people, processes, time, location, cost, etc. As a result, at least in part due to the sheer number of alternatives, it is significantly more difficult to identify appropriate alternatives. There is also increased risk associated with choosing an inappropriate alternative to an event. For example, due to the increased pace of change, there is often little if any time for an organization to change alternatives without further negative impacts to the organization (e.g., getting left behind by the competition).

Separate from the agility with which a decision is made, is actually making a business capability itself agile. Whereas some capabilities are built to last and not change very often in terms of their performance, others need to be built to be agile, which means not only able to be changed (flexibility), but also to be changed in a timely manner.

However, while "agility" is often considered when determining to responsive actions to an event, there is typically no common definition of what "agility" is or what it means to be "agile" either for decisions or business capabilities. Thus, discussions of agility within and/or across organizations are not always based on a common vocabulary. Without a common vocabulary to describe agility and its performance, information exchanged with respect to agility is often inaccurate and/or incomplete information. As such, the timing of responsive actions and/or benefits of investment in agility changes can not be determined or may be incorrect. For example, expending resources to implement a responsive action within weeks of an event may be a waste of resources (overtime, computer resources, etc.) when the financial benefits of the responsive action can still be realized even if the responsive action is implemented months later. As another example, an investment in real-time delivery information for certain products (e.g., books or music discs) can be a waste of resources because consumers simply don't care when they get the product, as long as it is received within a reasonable amount time.

Further, within the business world, there has been a presumption that increased agility is always positive. Thus, to some extent, any actions an organization could take to become more agile were implemented with little, if any, analysis. However, in response to some events, additional agility provides little if any benefit to the organization. For example, investing resources to increase the ease with which a business capability can be changed in the future provides little benefit to an organization, when there is little chance of the business capability having to be changed.

Without a common definition of agility and metrics for determining when increased or decreased agility in decisions making or business capabilities may or may not be of value, it is also difficult to formulate computer based tools and methods to assist in making agility related decisions. As result, organizations can have further difficulties appropriately incorporating agility into existing business models. For example, it can be difficult for an organization to differentiate particular business components that would benefit from increased agility or decreased agility.

Without computer based tools and methods, the problem grows increasing complex as the size of an organization increases. For example, a large multi-national corporation may have virtually no way to determine that increasing or decreasing the agility of one process within one of hundreds or thousands of business units is financially worthwhile, when agility considerations are not integrated into their business models. Thus, an organization's investment in agility is ultimately often an unstructured process, the benefits of which are difficult to measure.

BRIEF SUMMARY

The present invention extends to methods, systems, and computer program products for structured implementation of business adaptability changes. Embodiments include responding to change trigger event related to an organizations performance. A change trigger event is received from an operating business model for the organization. It is determined that a plurality of resources is available for responding to the change trigger event. The plurality of resources includes resources internal to the organization and resources external to the organization.

A pre-defined common resource description vocabulary is accessed. The pre-defined common resource description vocabulary describes resources so as to provide a common vocabulary for a plurality of different organizations to consider resource selection for responding to change trigger events. The defined common resource description vocabulary provides a mechanism for the plurality of different organizations to consider resource selection for responding to change trigger events in a uniform manner and provides a mechanism to produce consistent repeatable results for resource selection.

One or more resource descriptions in the pre-defined common resource description vocabulary are referred to select a set of one or more responses for responding to the change trigger event. Each response in the set of responses indicates the use of one or more resources from the plurality of available resources described in the defined common resource description vocabulary. A decision is issued to select one of the responses, in the set of one or more responses, as the response to be implemented to respond to the change trigger event.

Embodiments of the invention also include structured implementation of a change to the business adaptability of some aspect of an organization, such as, for example, to improve the performance of the organization (e.g., sell more widgets, produce widgets more efficiently, reduce overhead, etc.). A decision is received. The decision is indicative of a response to a change trigger event The response includes implementing the functionality of one or more of an organizations business capabilities. It is determined that the response is relevant to the ability of one or more of the organization's business capabilities to adapt.

Determining relevancy includes referring to a pre-defined common vocabulary for business adaptability. The pre-defined common vocabulary defines a range of business adaptability. The pre-defined common vocabulary provides a mechanism for a plurality of different organizations to consider changes in business adaptability in a uniform manner and provides a mechanism to produce consistent repeatable results for considered changes in business adaptability.

Determining relevancy also includes referring to a collection of business capabilities representing the performance of the organization. It is determined that the response is relevant to the business adaptability of one or more business capabilities, from among the collection of business capabilities. The determination of relevancy is made based on the pre-defined common vocabulary for business adaptability.

Any significant business capabilities, from among the relevant business capabilities, are identified. Significant business capabilities are business capabilities that significantly impact the performance of the result of the response. It is determined that a change to the business adaptability of at least one of the significant business capabilities would improve the performance of the response. The determination to change is based on the pre-defined common vocabulary for business adaptability. The business adaptability of at least one significant business capability is changed in response to the determination to improve performance of the response.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
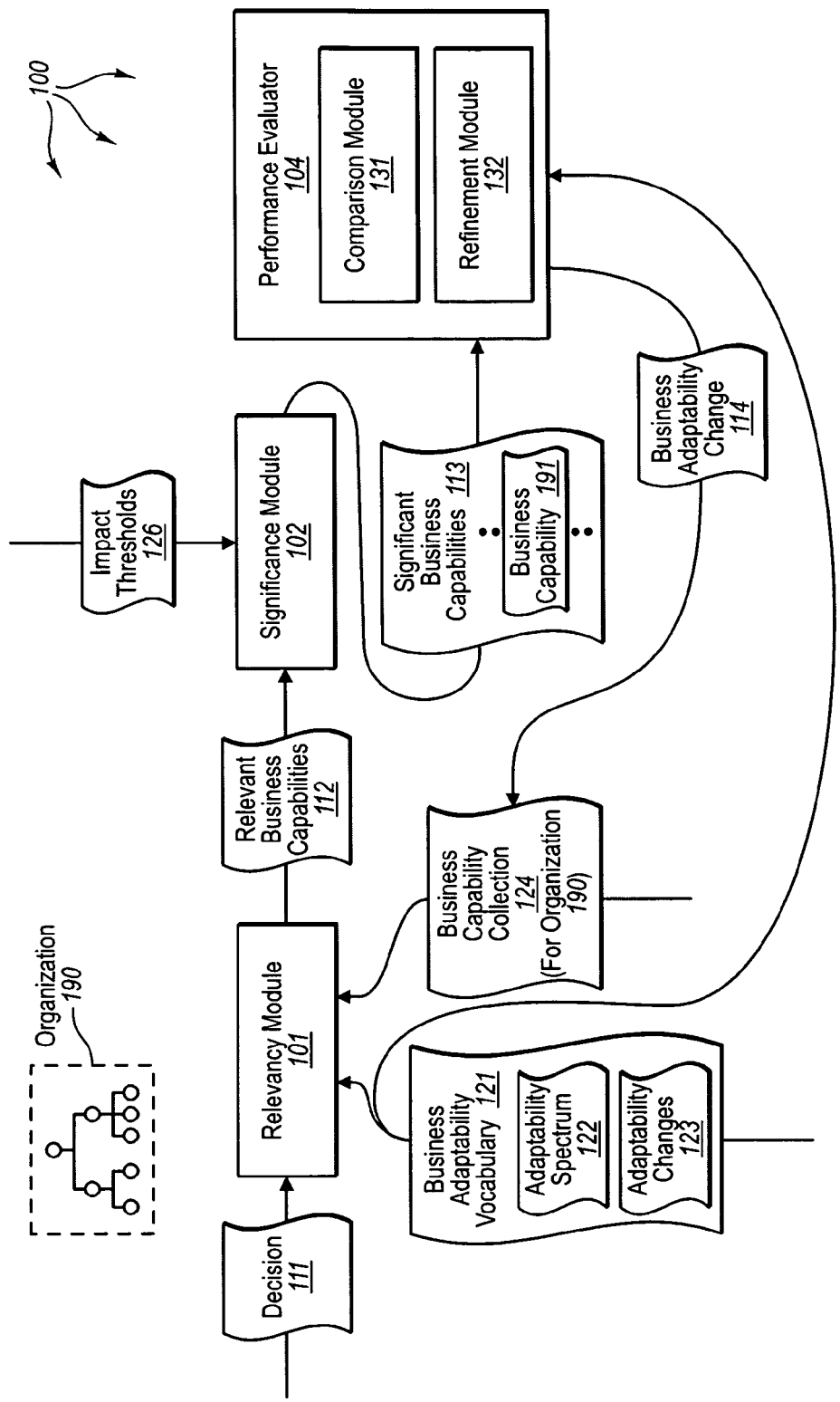
FIG. 1 illustrates an example computer architecture that facilitates structured implementation of business adaptability changes.

The present invention extends to methods, systems, and computer program products for structured implementation of business adaptability changes. Embodiments include responding to change trigger event related to an organizations performance. A change trigger event is received from an operating business model for the organization. It is determined that a plurality of resources is available for responding to the change trigger event. The plurality of resources includes resources internal to the organization and resources external to the organization.

A pre-defined common resource description vocabulary is accessed. The pre-defined common resource description vocabulary describes resources so as to provide a common vocabulary for a plurality of different organizations to consider resource selection for responding to change trigger events. The defined common resource description vocabulary provides a mechanism for the plurality of different organizations to consider resource selection for responding to change trigger events in a uniform manner and provides a mechanism to produce consistent repeatable results for resource selection.

One or more resource descriptions in the pre-defined common resource description vocabulary are referred to select a set of one or more responses for responding to the change trigger event. Each response in the set of responses indicates the use of one or more resources from the plurality of available resources described in the defined common resource description vocabulary. A decision is issued to select one of the responses, in the set of one or more responses, as the response to be implemented to respond to the change trigger event.

Embodiments of the invention also include structured implementation of a change to the business adaptability of some aspect of an organization, such as, for example, to improve the performance of the organization (e.g., sell more widgets, produce widgets more efficiently, reduce overhead, etc.). A decision is received. The decision is indicative of a response to a change trigger event. The response includes implementing the functionality of one or more of an organizations business capabilities. It is determined that the response is relevant to the ability of one or more of the organization's business capabilities to adapt.

Determining relevancy includes referring to a pre-defined common vocabulary for business adaptability. The pre-defined common vocabulary defines a range of business adaptability. The pre-defined common vocabulary provides a mechanism for a plurality of different organizations to consider changes in business adaptability in a uniform manner and provides a mechanism to produce consistent repeatable results for considered changes in business adaptability.

Determining relevancy also includes referring to a collection of business capabilities representing the performance of the organization. It is determined that the response is relevant to the business adaptability of one or more business capabilities, from among the collection of business capabilities. The determination of relevancy is made based on the pre-defined common vocabulary for business adaptability.

Any significant business capabilities, from among the relevant business capabilities, are identified. Significant business capabilities are business capabilities that significantly impact the performance of the response. It is determined that a change to the business adaptability of at least one of the significant business capabilities would improve the performance of the result of the response. The determination to change is based on the pre-defined common vocabulary for business adaptability. The business adaptability of the at least one significant business capability is changed in response to the determination to improve performance of the result of the response.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, it should be understood, that upon reaching various computer system components, program code means in the form of computer-executable instructions or data structures can be transferred automatically from transmission media to physical storage media (or vice versa). For example, computer-executable instructions or data structures received over a network or data link can be buffered in RAM within a network interface module (e.g., a "NIC"), and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Within this description and the following claims, "decision agility" is defined as the speed with which an organization can process a change trigger event to determine actions to take in response to a change trigger event.

Figure 5:
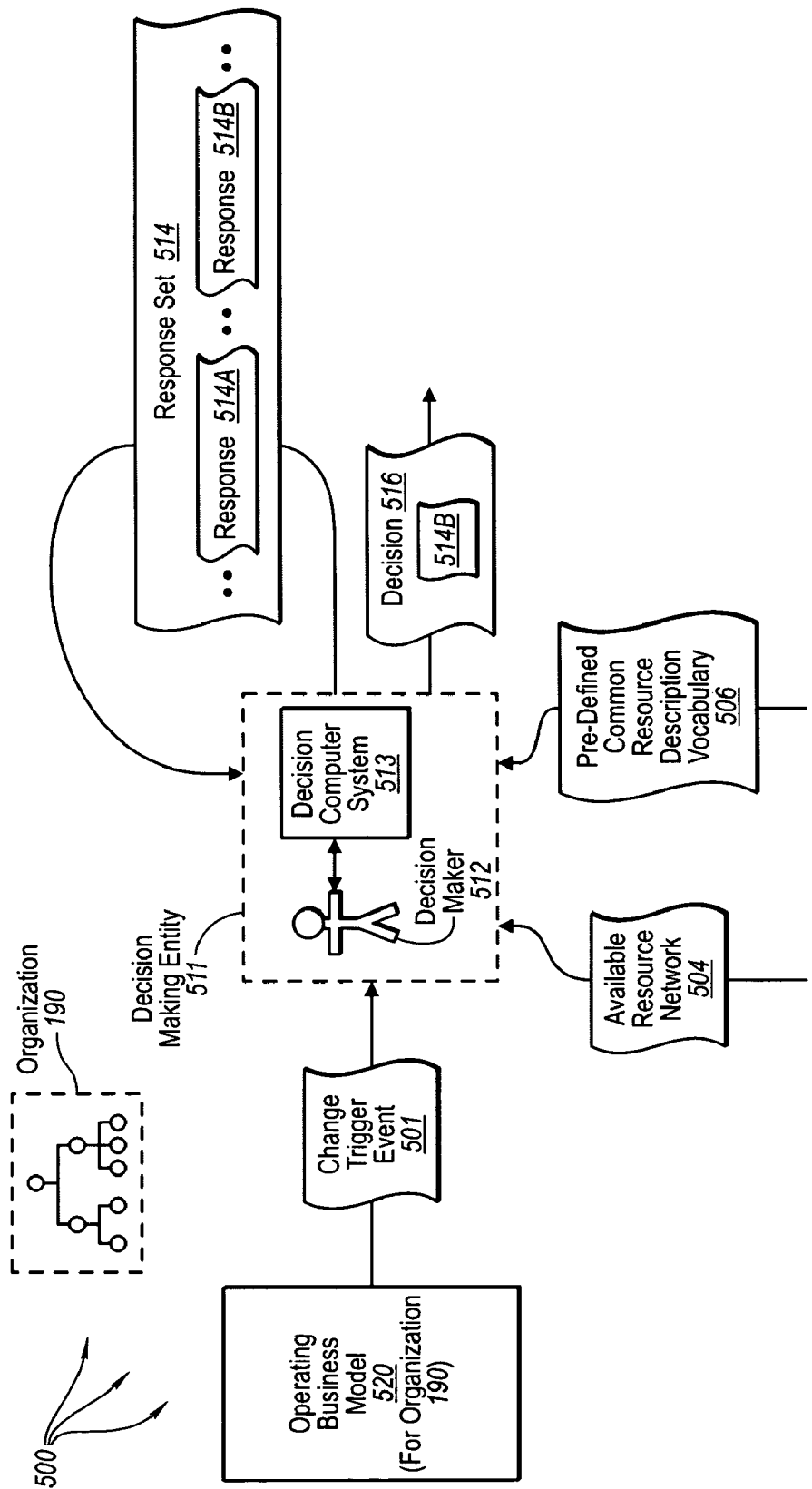
FIG. 5 illustrates an example architecture that facilitates determining how to respond to a change trigger event.

FIG. 5 illustrates an example (e.g., computer) architecture 500 that facilitates determining how to respond to a change trigger event related to an organization's performance. Referring to FIG. 5, computer architecture 500 includes operating business model 520, decisions making entity 511, available resource network 504, and pre-defined common resource description vocabulary 506. Each of the depicted components can be connected to one another or accessed over (or be part of) a network, such as, for example, a Local Area Network ("LAN"), a Wide Area Network ("WAN"), and even the Internet.

Figure 3A:
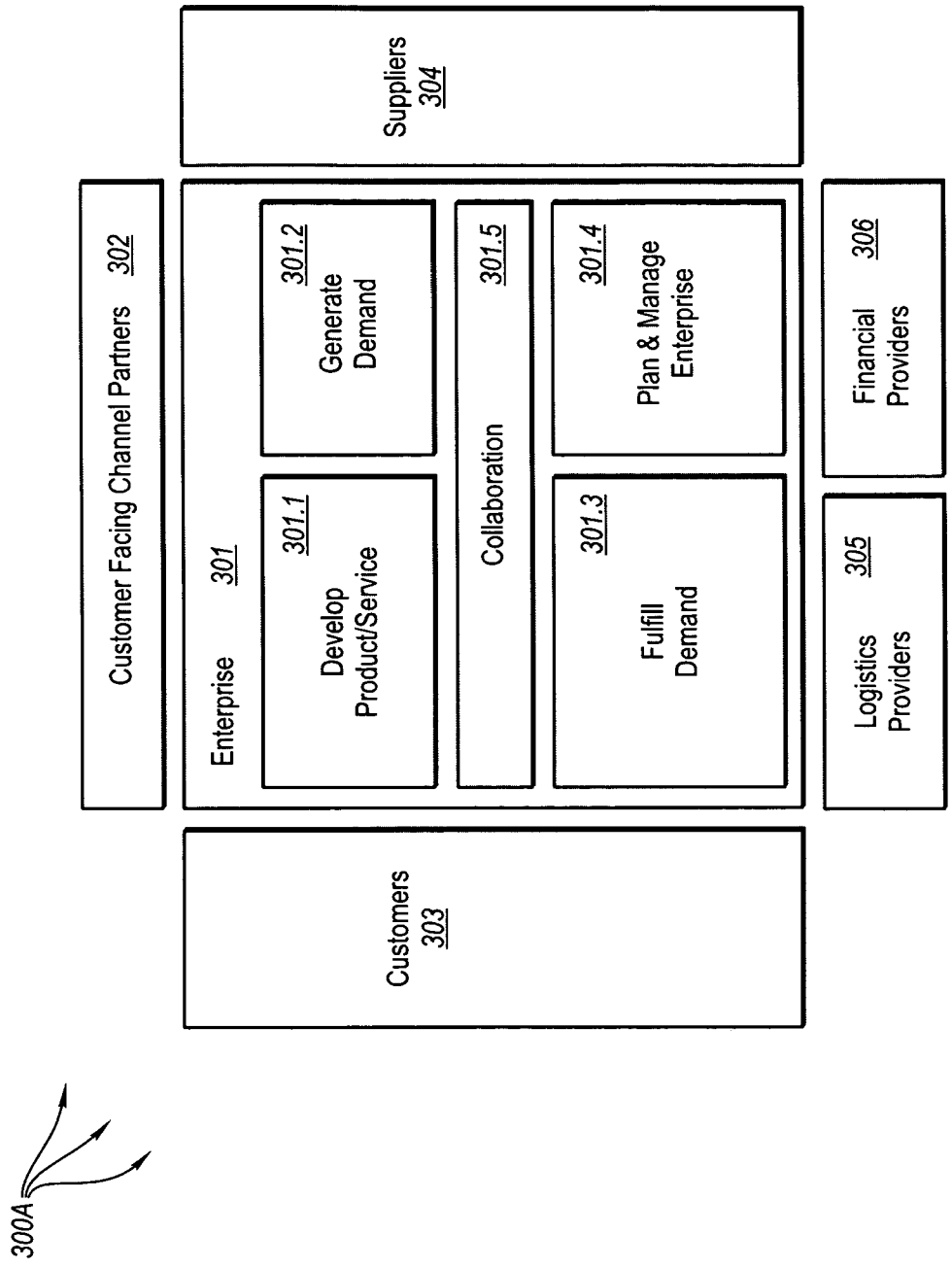
FIGS. 3A and 3B illustrate a visual representation of a collection of business capabilities at varied levels of detail.
Figure 3B:
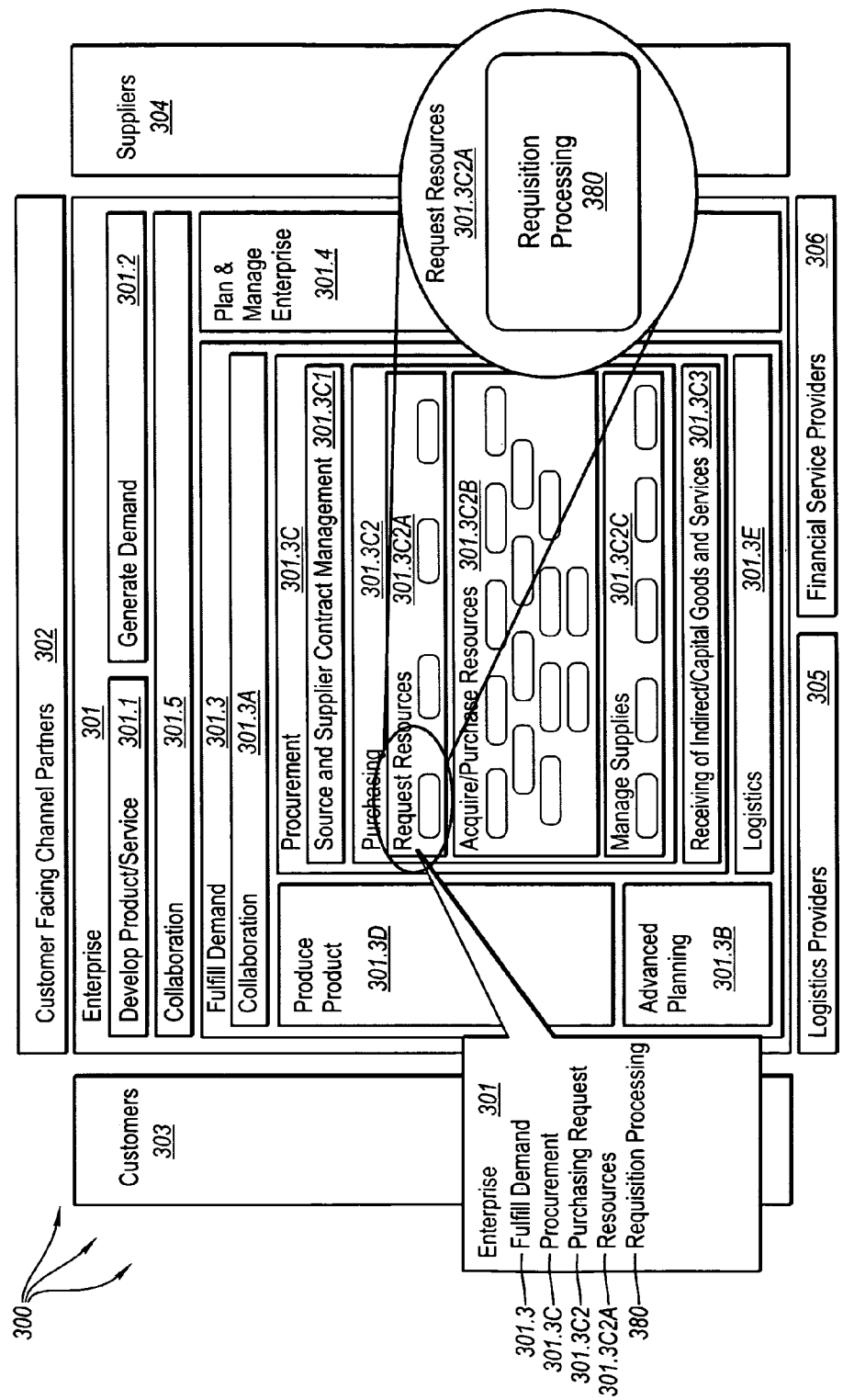

Generally, operating business model 520 can be a model that models the operation of an organization (e.g., business), such as, for example, organization 190. Business model 520 can model one or more interoperating components of an organization to represent how the organization functions and performs. Referring briefly to FIG. 3B, FIG. 3B depicts an example visual representation 300 (e.g., a model) of a collection of business capabilities for an organization. As depicted, the visually rendered business capabilities in visual representation 300 are rendered with varied levels of detail. Visual representation 300 will be described in further detail below. However, virtually any type of model can be used.

Generally, operating business models are configured to emit change trigger events in response to an external or internal exception or variance to existing business expectations, metrics, or plans (responsive) or from of a course of business (proactive). For example, operating business model 520 can emit change trigger event 501 in response to expectations, variances, etc. to expectations, metrics, or plans (responsive) or from of a course of business (proactive) for organization 190.

Available resource network 504 represents a plurality of resources that are available to organization 190 to respond to change trigger events emitted from operating business model 520. Available resource network 504 can include human resources, materials, equipment, computerized resources, etc., that are internal and/or external to organization 190. Thus, in some embodiments, available resource network 504 provides different combinations of options for implementing any of a significant number of different responses to a change trigger event.

Additionally, a pre-defined common resource description vocabulary can provide a mechanism for entities to discuss available resources using a common vocabulary. For example, pre-defined common resource description vocabulary 506 can provide a mechanism for entities (e.g., business organization 190) to discuss resources of available resource network 504 using a common vocabulary (defined in pre-defined common resource description vocabulary 506). Further, a pre-defined common resource description vocabulary provides a mechanism to produce consistent repeatable results when considering how to respond to a change trigger event. For example, pre-defined common resource description vocabulary 506 provides a mechanism to produce consistent repeatable results when considering what resources, from available resource network 504, are to be used in a response to change trigger event 501. Thus, for example, it may be easier for organization 190, or even external observers of organization 190, to determine if an appropriate response to change trigger event 501 was made. Accordingly, organization 190 as well as external observers can also make more informed financial decisions based on quantifiable data.

Decision making entity 511 can be a combination of human and computer-based decision making that determines how to respond to change trigger events from operating business model 520. As depicted, decision making entity 511 includes decision maker 512 and decision computer system 513. Decision maker 512 can represent an individual (e.g., a Chief Executive Officer or President, a manager, a supervisor, am employee, etc.,) or a group of individuals (e.g., a group of company officers, board of directors, a committee, etc.).

Decision computer system 513 can represent a single computer or a network of interoperating computers configured to at least provide decision maker 512 with information that assists in responding to a change trigger event.

Generally, the reliance on a decision maker and a decision computer system for responding to change trigger event can vary. Thus, the significance of decision maker vs. a decision computer system can also vary. The variance can be based on an organizations structure. For example, financial companies may rely more heavily on automated computer-based decision making. On the other hand, human resource companies may rely more heavily on human-based decision making. The variance can also be based on a received change trigger event. Some change trigger events may be more suited to automated decision making, such as, for example, responding to a competitors price changes. On the other hand, other change trigger events may be more suited to human decision making, such as, for example, responding to a medical emergency.

Figure 6:
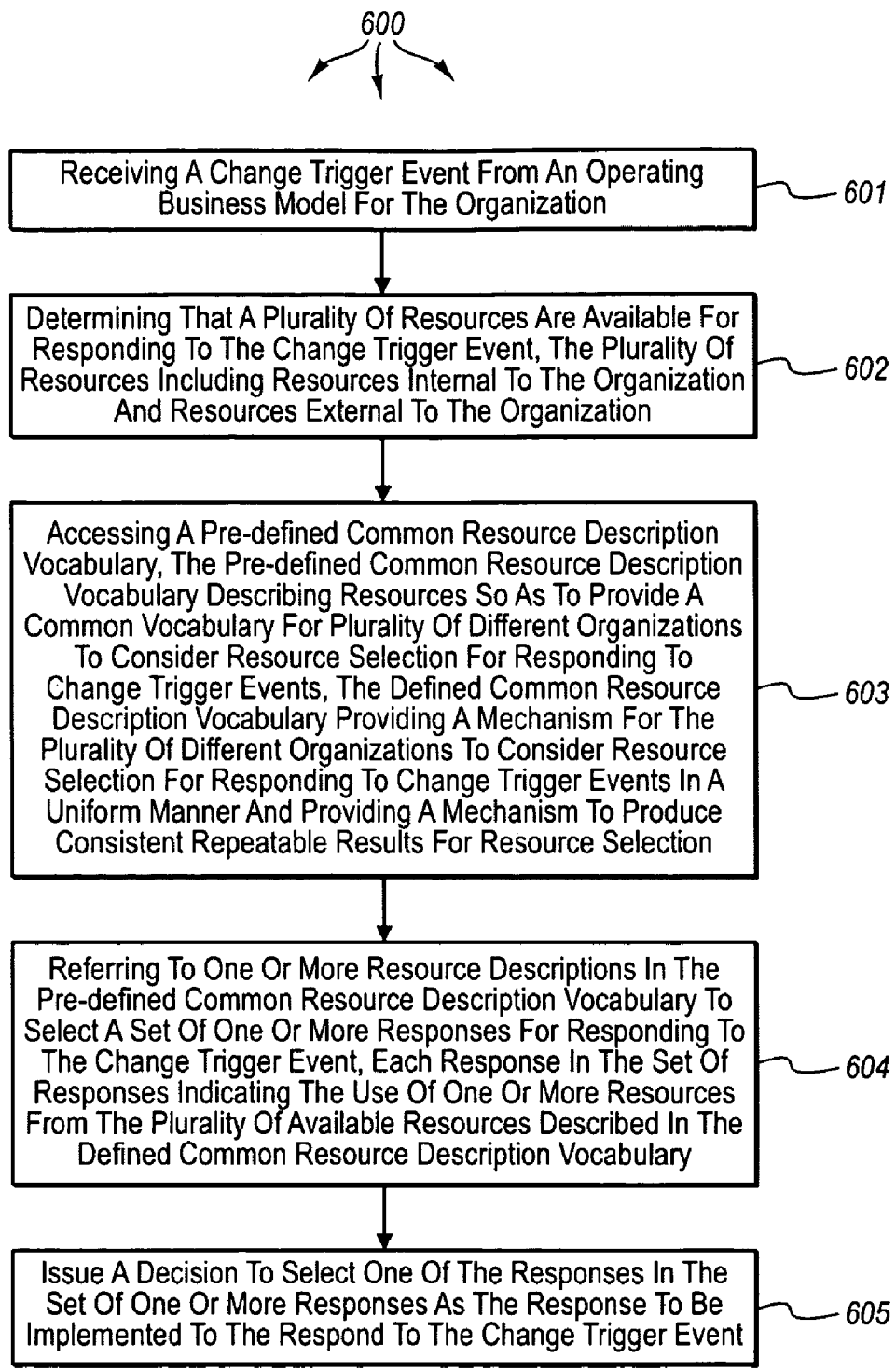
FIG. 6 illustrates a flow chart of an example method for determining how to respond to a change trigger event.

In some embodiments, a decision making entity makes a decision about what response is appropriate relative to a change trigger event based on an available resource network and a pre-defined resource description vocabulary. FIG. 6 illustrates a flow chart of an example method 600 for determining how to respond to change trigger event related to an organizations performance. Method 600 will be described with respect to the components and data in computer architecture 600.

Method 600 includes an act of receiving a change trigger event from an operating business model for the organization (act 601). For example, decision making entity 511 can receive change trigger event 501 from operating business model 520. Method 600 includes an act of determining that a plurality of resources are available for responding to the change trigger event, the plurality of resources including resources internal to the organization and resources external to the organization (act 602). For example, decision making entity 511 (through a combination of human-based and computer-based mechanisms) can determine that the resources of available resource network 504 are available for responding to change trigger event 501. Available resource network 504 can include resources that are internal and/or external to organization 190.

Method 600 includes an act of accessing a pre-defined common resource description vocabulary, the pre-defined common resource description vocabulary describing resources so as to provide a common vocabulary for a plurality of different organizations to consider resource selection for responding to change trigger events, the defined common resource description vocabulary providing a mechanism for the plurality of different organizations to consider resource selection for responding to change trigger events in a uniform manner and providing a mechanism to produce consistent repeatable results for resource selection (act 603). For example, decision making entity 511 can access pre-defined common resource description vocabulary 506. Pre-defined common resource description vocabulary 506 provides a common vocabulary for organizations to use when considering resource selection for responding to change trigger events. As such, decision making entity 511 can use pre-defined common resource description vocabulary 506 to consider selecting resources from available resource network 504.

Accordingly, pre-defined common resource description vocabulary 506 provides a mechanism for a plurality of different organizations (e.g., other organizations in the same industry as organization 190, financial institutions, government regulators, investors, etc.) to consider resource selection for responding to change trigger events in a uniform manner. For example, using pre-defined common resource description vocabulary 506 another organization can more easily determine if organization 190 responded appropriately to change trigger event 501. Further, pre-defined common resource description vocabulary 506 provides a mechanism to produce consistent repeatable results for resource selection. For example, an appropriate response can be more easily replicated in the future (either by organization 190 or some other organization).

Method 600 includes an act of referring to one or more resource descriptions in the pre-defined common resource description vocabulary to select a set of one or more responses for responding to the change trigger event, each response in the set of responses indicating the use of one or more resources from the plurality of available resources described in the defined common resource description vocabulary (act 604). For example, decision making entity 511 can refer to one or more resource descriptions in pre-defined common resource description vocabulary 506 to select response set 514. Response set 514 includes a set of potential responses (e.g., response 514A, 514B, etc.) for responding to change trigger event 501. Each response in response set 514 indicates the use of one or more resources from available resource network 504 that are described in pre-defined common resource description vocabulary 506.

Method 600 includes an act of issuing a decision to select one of the responses in the set of one or more responses as the response to be implemented to respond to the change trigger event (act 605). For example, decision making entity 511 can issue decision 516 to select response 514B, from among the responses in response set 514, to be implemented as the response to change trigger event 501.

In some embodiments, a decision in response to a change trigger event may be to take no action and thus none of the potential responses are selected. In these embodiments, resources from available resource network 504 are not used.

Thus, embodiments of the invention can be used to increase the situational awareness of an organization when responding to a change trigger event. Information for formulating a response to a change trigger event can be identified, processed, and comprehended more efficiently and accurately. For example, an organization may be able to more quickly identify what actions of the organization are impacting results and in turn more quickly move to address any deficiencies. Accordingly, embodiments of the invention facilitate an increase in the decision agility of organizations.

After selection, a decision can be forwarded to relevant business capabilities for implementation. For example, decision 516 can be forwarded to relevant portions of organization 190 and/or other external organizations for implementation. Any portions of response 514B that are to utilize internal resources can be forwarded to the appropriate portion of organization 190. Any portions of response 514B that are to utilize external (to organization 190) resources can be forward to the appropriate external organization. Based on received decisions, it can be determined if any business adaptability changes are appropriate.

FIG. 1 illustrates an example computer architecture 100 that facilitates structured implementation of business adaptability changes. Referring to FIG. 1, computer architecture 100 includes relevance module 101, significance module 102, and performance evaluator 104. Each of the depicted components can be connected to one another over (or be part of) a network, such as, for example, a Local Area Network ("LAN"), a Wide Area Network ("WAN"), and even the Internet. Accordingly, each of the depicted components as well as any other connected components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

Generally, relevancy module 101 is configured to receive a decision and a collection of business capabilities for an organization. An organization can be virtually any type of business related entity, such as, for example, a corporation (profit or non-profit), a partnership, a limited partnership ("LP"), a limited liability partnership ("LLP"), a limited liability corporation ("LLC"), a sole proprietorship, etc. Based on a pre-defined business adaptability vocabulary, relevancy module 101 can determine and output any business capabilities that are relevant to the received decision.

A decision can indicate a response to a change trigger event. The change trigger event can be any event in the business environment of an organization that causes the organization to consider a change in the adaptability of one or more business capabilities. For example, a change trigger event can be an external exception or variance relative to existing business expectations, metrics, or plans. An external exception or variance can result from the activities of customers, competitors, partners, suppliers, regulatory agencies, financial services organizations. etc. A change trigger can also be an internal exception or variance relative to existing business expectations, metrics, or plans. An internal exception or variance can result from creation of products and services, demand generation, fulfillment of demand, planning and managing, etc, within an organization.

A change trigger event can also be from normal business operations. For example, an organization can proactively (as opposed to reactively) manage its change and make decisions about what change is appropriate prior to the occurrence of any exceptions or variances.

Generally, a pre-defined common vocabulary provides a mechanism for a plurality of different organizations to consider changes in business adaptability in a uniform manner. A pre-defined common vocabulary also provides a mechanism to produce consistent repeatable results for considered changes in business adaptability.

A pre-defined business adaptability vocabulary can include a spectrum of adaptability ranging from increased ability to adapt to decreased ability to adapt. Within this specification and the following claims, "agility" is defined as ready to adapt to changing business requirements within specific time constraints relevant to the specific business capability. Within this specification and the following claims, "flexibility" is defined as ready to adapt to changing business requirements with no specifics relative to time or timeliness. Within this specification and the following claims, "consistent" and "durable" are defined as not ready or able to adapt to changing business requirements.

Figure 4:
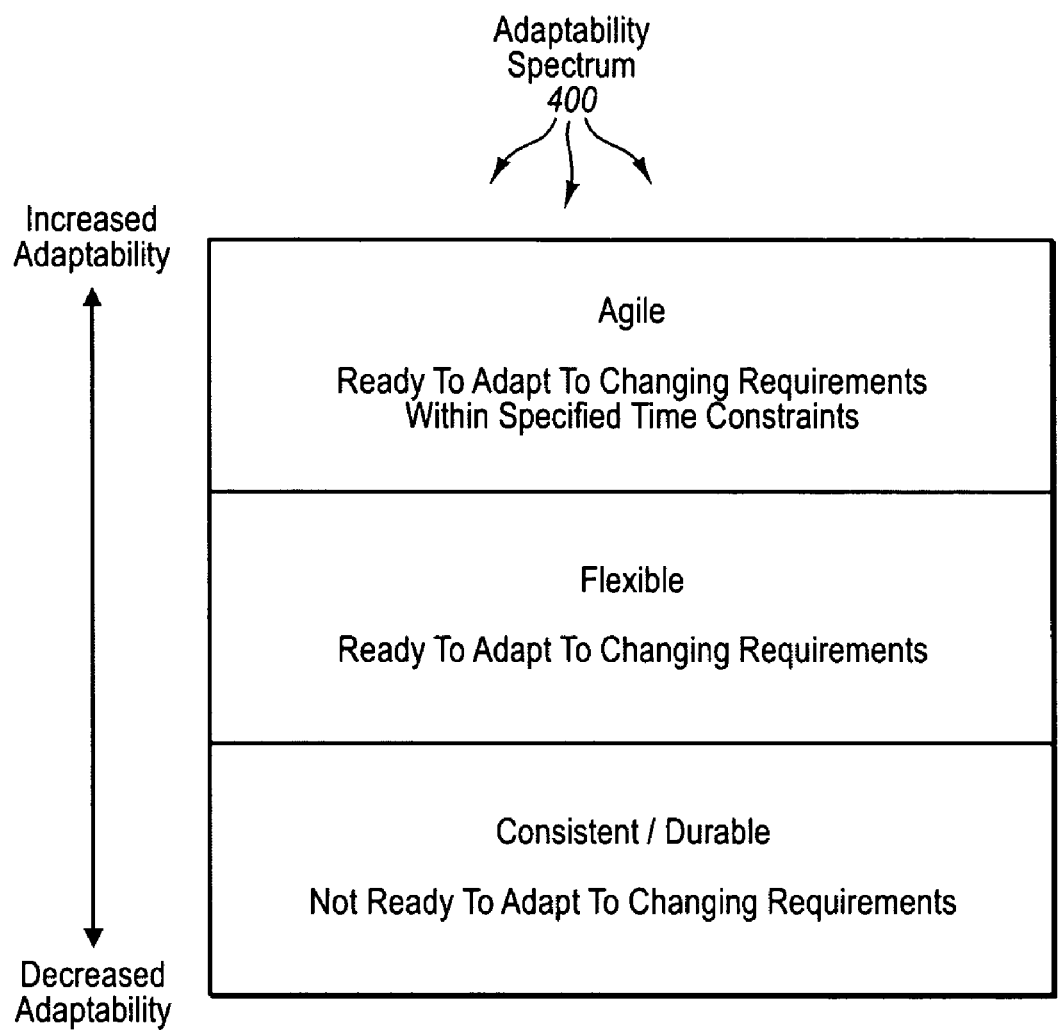
FIG. 4 illustrates an adaptability spectrum.

Accordingly, in some embodiments, a pre-defined business adaptability vocabulary can include a spectrum of adaptability ranging from agile (increased adaptability) to consistent/durable (decreased adaptability). "Flexibility" can be included within the pre-defined business adaptability vocabulary. Flexibility indicates more adaptability than consistent/durable but less adaptability than agile. Referring briefly to FIG. 4, FIG. 4 depicts adaptability spectrum 400. As depicted, adaptability spectrum 400 includes a range of adaptabilities from agile to consistent/durable. Adaptability spectrum 400 can be an example of adaptability spectrum 122.

A pre-defined business adaptability vocabulary can also define adaptability changes. Adaptability changes are activities that an organization can implement for business capabilities to alter adaptability of the business capabilities within an adaptability spectrum. Adaptability changes can include how to alter the adaptability of a business capability to make the business capability more or less adaptable. For example, an adaptability change can indicate how transform a flexible business capability into an agile business capability (or vice versa).

Embodiments of the invention can include considering changes to and changing the adaptability of a variety of different types of business capabilities. For example, adaptability changes can be considered and implemented for economic driver/core capabilities that differentiate (e.g., brand) and directly impact business performance metrics. For example, if an organization produces widgets, capabilities related to the sale of widgets, acquiring sub-components to make widgets, production efficiency of widgets, widgets produced to the specific preferences or requirements of some or all customers, etc., can be considered economic driver/core capabilities.

Adaptability changes can also be considered and implemented for enabling or infrastructure capabilities. Enabling or infrastructure capabilities are part of a business and have to be performed. However, enabling or infrastructure capabilities do not necessary correlate with more important business performance metrics. For example, referring back to the example of producing widgets, payroll is likely a required capability. However, payroll does impact the production of widgets to the extent of the other previously listed capabilities.

Adaptability changes can also be considered and implemented for management capabilities, including executive managers and managers at other levels of an organization.

In some embodiments, the business capabilities for an organization are included together in a collection of business capabilities. A collection of business capabilities can be represented as a (e.g., structured or schematized) business capability model. An organization can formulate business capability attributes representing current performance of their collection of business capabilities. A modeling application (not shown) can receive the business capability attributes (e.g., from a business capability business layer) and model the business capability attributes into a business capability model. A business capability model can be represented in a variety of different ways depicting various levels of detail (e.g., up to the level of detail of the business capability attributes). A business capability model can be configured visually for output at a user-interface and/or can be retained as data for further processing.

Levels of detail can be used to represent (potentially interconnected) sub-capabilities that contribute to the performance other capabilities. FIGS. 3A through 3E depicted collections of business capabilities having various levels of detail and interconnection. Referring now to FIG. 3A, FIG. 3A depicts an example visual representation 300 (e.g., a model) of a collection of business capabilities for an organization. As depicted, the visually rendered business capabilities in visual representation 300 are rendered with varied levels of detail. For example, customer facing channel partners 302, customers 303, suppliers 304, logistic providers 305, and financial providers 306 are rendered with less detail. On the other hand, enterprise 301 is rendered with more detail, depicting other business capabilities that contribute to the performance of enterprise 301. For example, develop product service 301.1, generate demand 301.2, fulfill demand 301.3, plan and manage enterprise 301.4, and collaboration 301.5 are expressly rendered within enterprise 301. Thus, visual representation 3000 represents that develop product service 301.1, generate demand 301.2, fulfill demand 301.3, plan and manage enterprise 301.4, and collaboration 301.5 contribute to the performance of enterprise 301.

Turning now to FIG. 3B, FIG. 3B depicts visual representation 300 with further levels of detail. FIG. 3B is representative of the way business capabilities can be broken down/decomposed into other capabilities. For example, fulfill demand 301.3 is increased by a number of levels of detail. Fulfill demand 301.3 includes collaboration 301.3A, advanced planning 301.3B, procurement 301.3C, produce product 301.3D, and logistics 301.3E. Thus, collaboration 301.3A, advanced planning 301.3B, procurement 601.3C, produce product 301.3D, and logistics 301.3E contribute to the performance of fulfill demand 301.3 (and as a result also contribute to the performance of enterprise 301).

Procurement 301.3C is further detailed to include source and supplier contract management 301.3C1, purchasing 301.3C2, and receiving of indirect/capital goods and services 301.3C3. Thus, contract management 301.3C1, purchasing 301.3C2, and receiving of indirect/capital goods and services 301.3C3 contribute to the performance of procurement 301.3C (and as a result also contribute to the performance of fulfill demand 301.3 and performance of enterprise 301).

Purchasing 301.3C2 is further detailed to include request resources 301.3C2A, acquire/purchase resources 301.3C2B, and manage supplies 301.3C2C. Thus, request resources 301.3C2A, acquire/purchase resources 301.3C2B, and manage supplies 301.3C2C contribute to the performance of purchasing 301.3C2 (and as a result also contribute to the performance of procurement 301.3C, fulfill demand 301.3, and performance of enterprise 301). Requisition processing 380 is a further sub-capability of request resources request resources 301.3C2A.

Figure 3C:
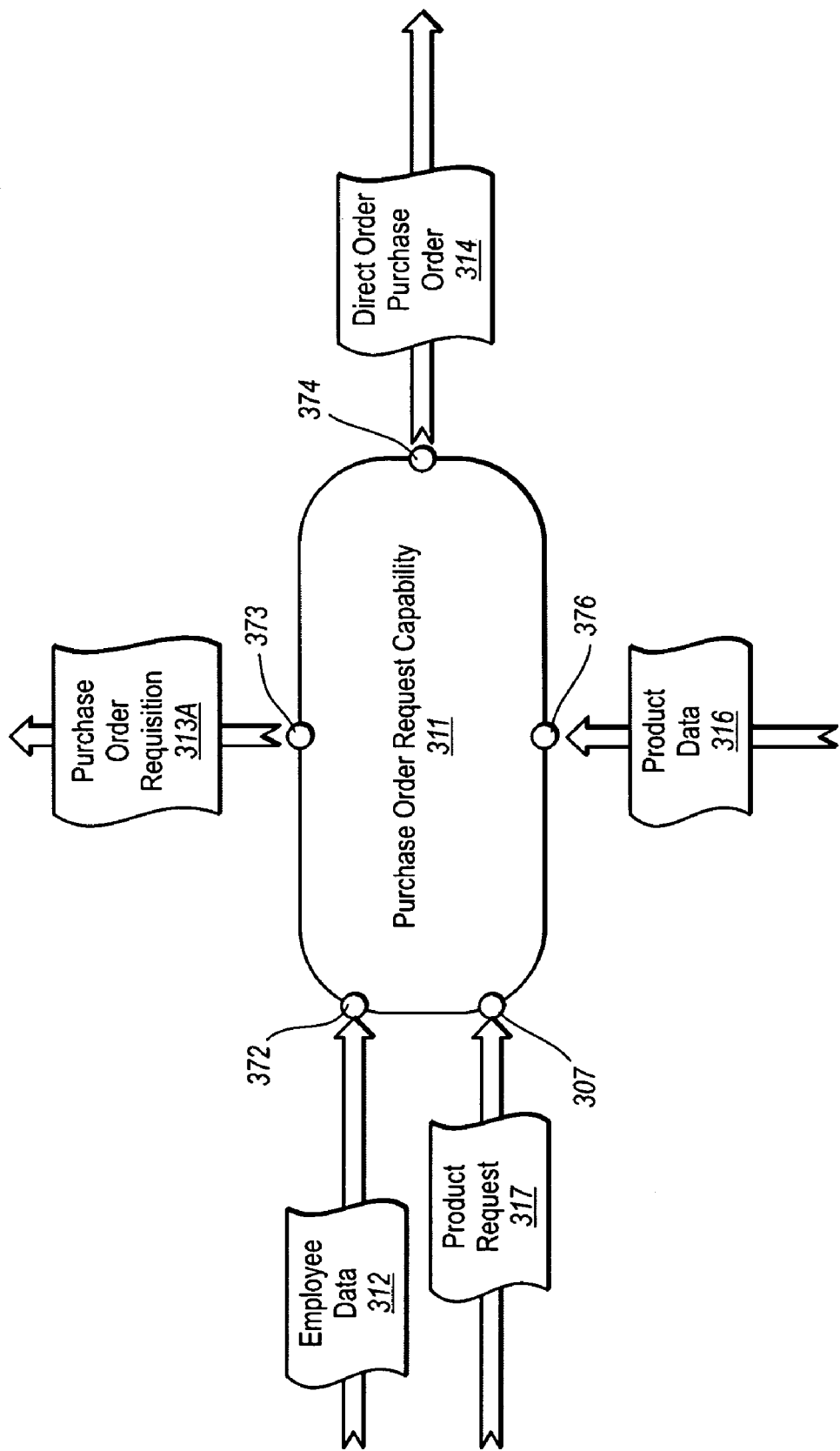
FIG. 3C illustrates an example of a modeled business capability.

Business capability models can also represent data that flows into and data that flows out of the modeled business capabilities. For example, FIG. 3C illustrates an example of a modeled business capability. FIG. 3C, includes purchase order request capability 311 (e.g., modeled based on structured capability data format). Purchase order request capability 311 includes ports 372, 376, and 307 (e.g., modeled based on a structured port data format) that receive employee data 312, product data 316, and product request 317 respectively (e.g., from other business capabilities). Purchase order request capability 311 can use employee data 312, product data 316 and product request 317 to formulate a purchase order request.

Purchase order request capability 311 includes ports 373 and 374 (e.g., modeled based on the structured port data format) that can send purchase order requisition 313A and direct order purchase order 314 respectively (e.g., to other business capabilities). Purchase order request capability 501 can include logic that determines, based on one or more of receive employee data 312, product data 316 and produce request 317, whether purchase order requisition 513A and/or direct order purchase order 314 is to be sent.

Thus, embodiments of the present invention can also utilize models of a network of business capabilities. A first business capability is modeled based upon formatted business capability attributes. A second business capability is modeled based upon the formatted business capability attributes. A connection between the first business capability and the second capability is modeled based upon the formatted business capability attributes.

Figure 3D:
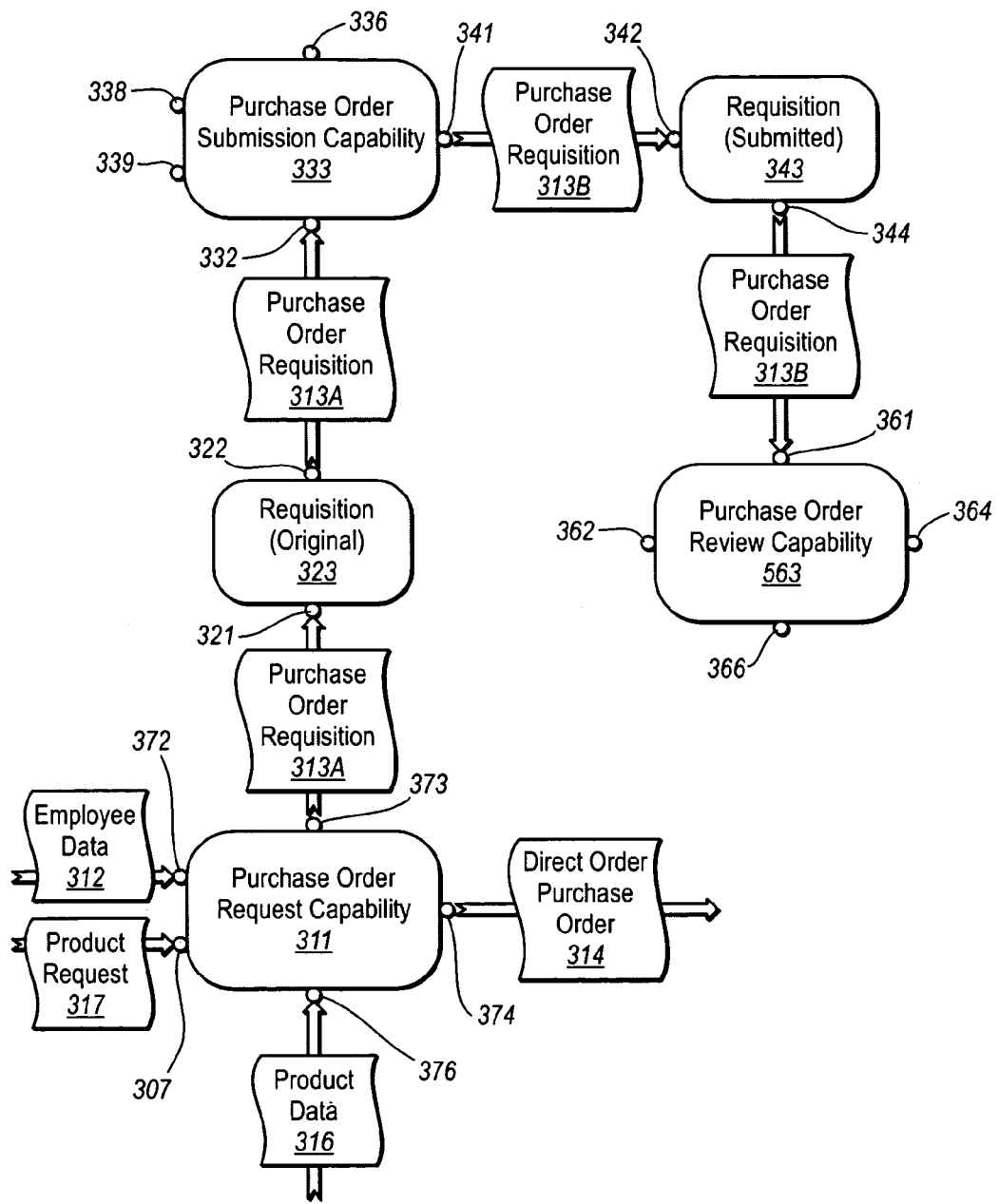
FIG. 3D illustrates a first view of an example of a network of modeled business capabilities.

FIG. 3D illustrates a first view of an example of a network of modeled business capabilities including purchase order request capability 311. As depicted, purchase order request capability 311 (a capability) sends purchase order request 313A out of port 373 to requisition 323 (a connector).

Requisition 323 receives purchase order requisition 313A at port 312. Requisition 323 sends purchase order requisition 313A out of port 322 to purchase order submission capability 333. Thus, requisition 323 transfers purchase order requisition 313A from purchase order request capability 311 to purchase order submission capability 333. Accordingly, a connector can be viewed as a business capability wherein the capability of the connector is to transfer data between other capabilities.

Purchase order submission capability 333 receives purchase order requisition 313A at port 332. Purchase order submission capability 333 includes other ports, including ports 336, 338, 339, and 341. Each of the ports 336, 338, 339, and 341 can be used to send data to and/or receive data from other capabilities or connectors. More specifically, purchase order submission capability 332 sends purchase order 313B out of port 341 to requisition 343 (a connector). Although similar to purchase order requisition 313A, purchase order requisition 313B can differ from purchase order 313A as a result of processing at purchase order submission capability 332.

Requisition 343 receives purchase order requisition 313B at port 342. Requisition 343 sends purchase order requisition 313B out of port 344 to purchase order review capability 363. Purchase order review capability 563 receives purchase order requisition 313B at port 361. Purchase order review capability 363 includes other ports, including ports 362, 364, and 366. Each of the ports 362, 364, and 366 can be used to send data to and/or receive data from other capabilities or connectors.

Although one-way ports and connectors have been depicted in FIG. 3D, it should be understood that embodiments of the present invention can include two-way ports and/or two-way connectors. For example, it may be that, from time to time, requisition 323 also transfers data from purchase order submission capability 333 (coming out of port 332 and into port 322) to purchase order request capability 311 (coming out of port 321 and into port 373). Similarly, it may be that, from time to time, requisition 343 also transfers data from purchase order review capability 363 (coming out of port 361 and into port 344) to purchase order submission capability 333 (coming out of port 342 and into port 341).

Figure 3E:
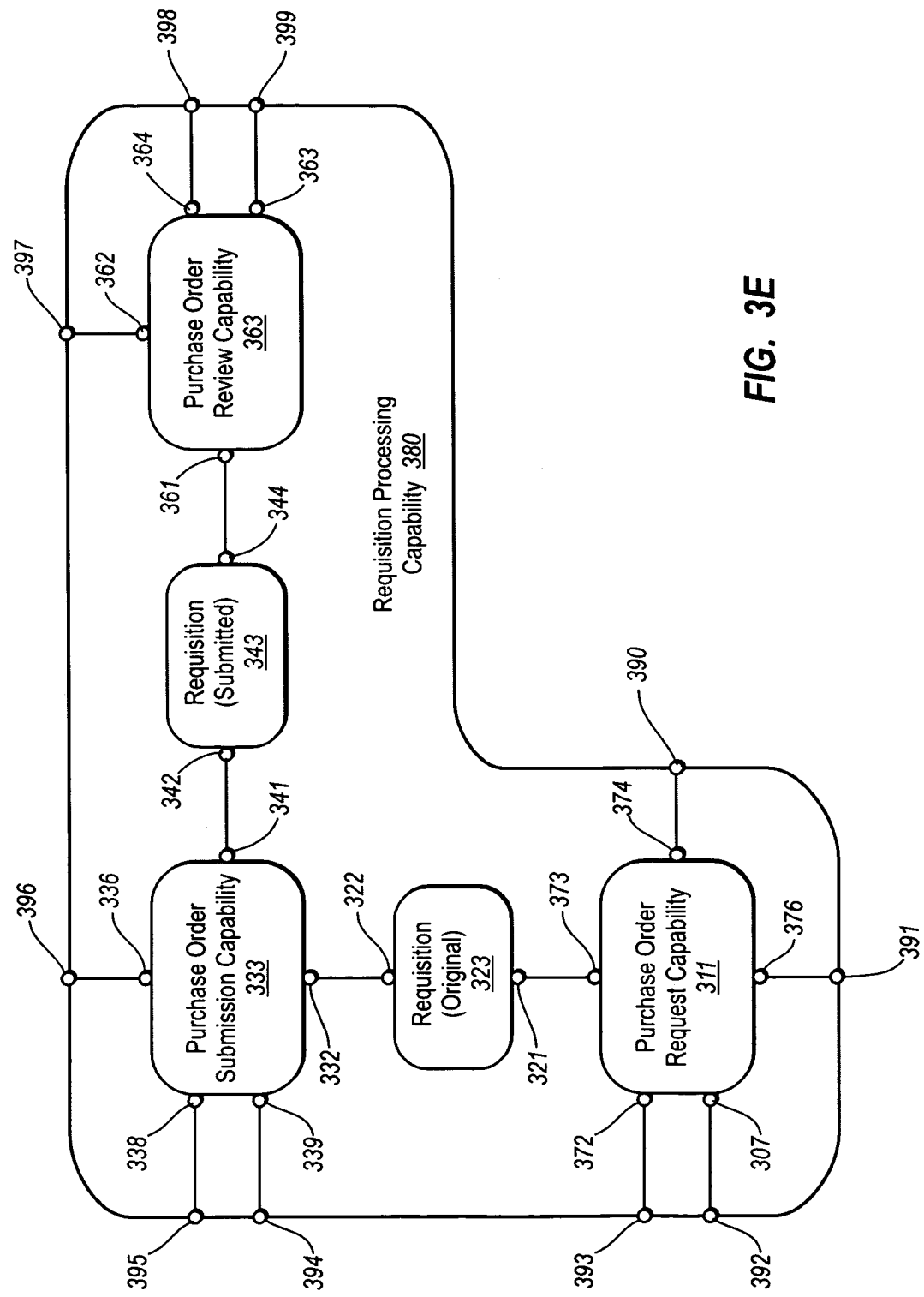
FIG. 3E illustrates a second view of the example of a network of modeled business capabilities.

A network of business capabilities can also be represented in a manner that abstracts the data exchanged between various business capabilities and connectors in the business capability network. Further, in some embodiments and as previously described, a network of more granular business capabilities (or those at higher levels of detail) can be used to model a more coarse business capability (or those at lower levels of detail). FIG. 3E illustrates a second view of the example of a network of modeled business capabilities in FIG. 3D representing requisition processing capability 380 (from FIG. 3B).

The network of business capabilities in FIG. 3E abstracts out the data that is exchanged between the business capabilities and connections in FIG. 3D. FIG. 3E further depicts that the more granular business capabilities and connections in FIG. 3D can be used to model a more coarse requisition processing capability 380. Ports 390-399 represent that requisition processing capability 380 can exchange data with other business capabilities and connectors, for example, included in request resources 301.3C2A (of FIG. 3B) or in part of some other general procurement network of business capabilities.

Returning to FIG. 1, significance module 102 is configured to receive relevant business capabilities. Based on impact thresholds, significance module 102 can identify and output significant business capabilities (from among the relevant business) that impact performance of the organization. An impact threshold indicates a requisite impact on performance that a business capability is to have before a change to the adaptability of the business capability is considered. An impact threshold can be a number, percentage, or some other indicator. Accordingly, a significant business capability (e.g., an economic driver or core business capability) is a business capability that satisfies an impact threshold (and thus likely has an increased impact on the performance of an organization).

Significance module 102 can compare the performance impact of each relevant business capability to appropriate impact thresholds. Business capabilities that satisfy appropriate impact thresholds can be forwarded on to performance evaluator 104. On the other hand, business capabilities that do not satisfy appropriate impact thresholds are dropped. Thus, impact thresholds can be used to filter out capabilities that, while relevant, have a reduced impact on an organizations performance.

Significance module 102 can determine the performance impact of a business capability in a variety of different ways. For example, significance module 102 can derive a capability's impact on performance from the number of interconnections to other business capabilities. That is, well connected capabilities can have a greater impact on performance than lesser connected capabilities. As such, considering changes to the adaptability of well connected capabilities can potentially be viewed as more worthwhile.

Significance module 102 can also consider the types of data (e.g., product sales data, financial agreement data, human resources data, etc) that pass through a business capability when deriving a capability's impact on performance. When data related to economic drivers and core functions of an organization pass through a business capability, this can indicate that the business capability has an increased impact on performance. For example, when an organization produces widgets, a business capability that inputs and/or outputs demand fulfillment data for widgets can have an increased impact on the performance of the organization. On the other hand, for the same organization, a business capability that inputs and/or outputs human resources data likely has less of an impact on the performance of the organization.

Alternately, a collection of business capabilities can expressly indicate (e.g., economic driver or core) capabilities that have a relatively significant impact on organization performance.

Performance evaluator 104 is configured to receive significant business capabilities. Based on the pre-defined business adaptability vocabulary, performance evaluator 104 can determine if a change to the adaptability of any significant business capabilities would improve the performance of the organization with at least a basic understanding of organizational impact (disruption), cost, and risk. Any adaptability change that would result in improved performance can be incorporated back into the collection of business capabilities.

Embodiments of the invention can determine that an increase in timely adaptability is appropriate, such as, for example, changing adaptability from consistent/durable to flexible or agile or changing adaptability from flexible to agile. Likewise, embodiments of the invention can determine that an decrease in adaptability is appropriate, such as, for example, changing adaptability from agile to flexible or consistent/durable or changing adaptability from flexible to consistent/durable. Embodiments can also determine that no change in adaptability is appropriate. For example, a current adaptability may continue to provide the best performance in view of a change trigger event.

As depicted performance evaluator 104 includes comparison module 131 and refinement module 132. Generally, comparison module 131 is configured to compare received significant business capabilities to potential adaptability changes to the received significant business capabilities. For example, a shipping capability can be compared to a more or less adaptable version of the shipping capability. Comparison module 131 can compare based on measureable business objectives, such as, for example, cost, production efficiency, etc. Results of a comparison can reveal if more or less adaptability for a business capability would improve performance for the organization. Potential adaptability changes can be implemented from defined adaptability changes in a pre-defined business adaptability vocabulary.

If a potential adaptability change results in improved performance, the change can be incorporated back into the collection of business capabilities. Refinement module 132 is configured to refine a collection of business capabilities to implement a change in the adaptability for one or more business capabilities. Refinement can include altering how a business capability does its work to increase or decrease the adaptability of the business capability within an adaptability spectrum. Accordingly, refinement module 132 can formulate a business adaptability change that is integrated back into a collection of business capabilities.

An adaptability change (or non-change) can address an exception or variance relative to existing business expectations, metrics, or plans indicated in an internal or external change trigger event. An adaptability change can also be used to proactively adjust prior to the occurrence of any exceptions or variances.

Figure 2:
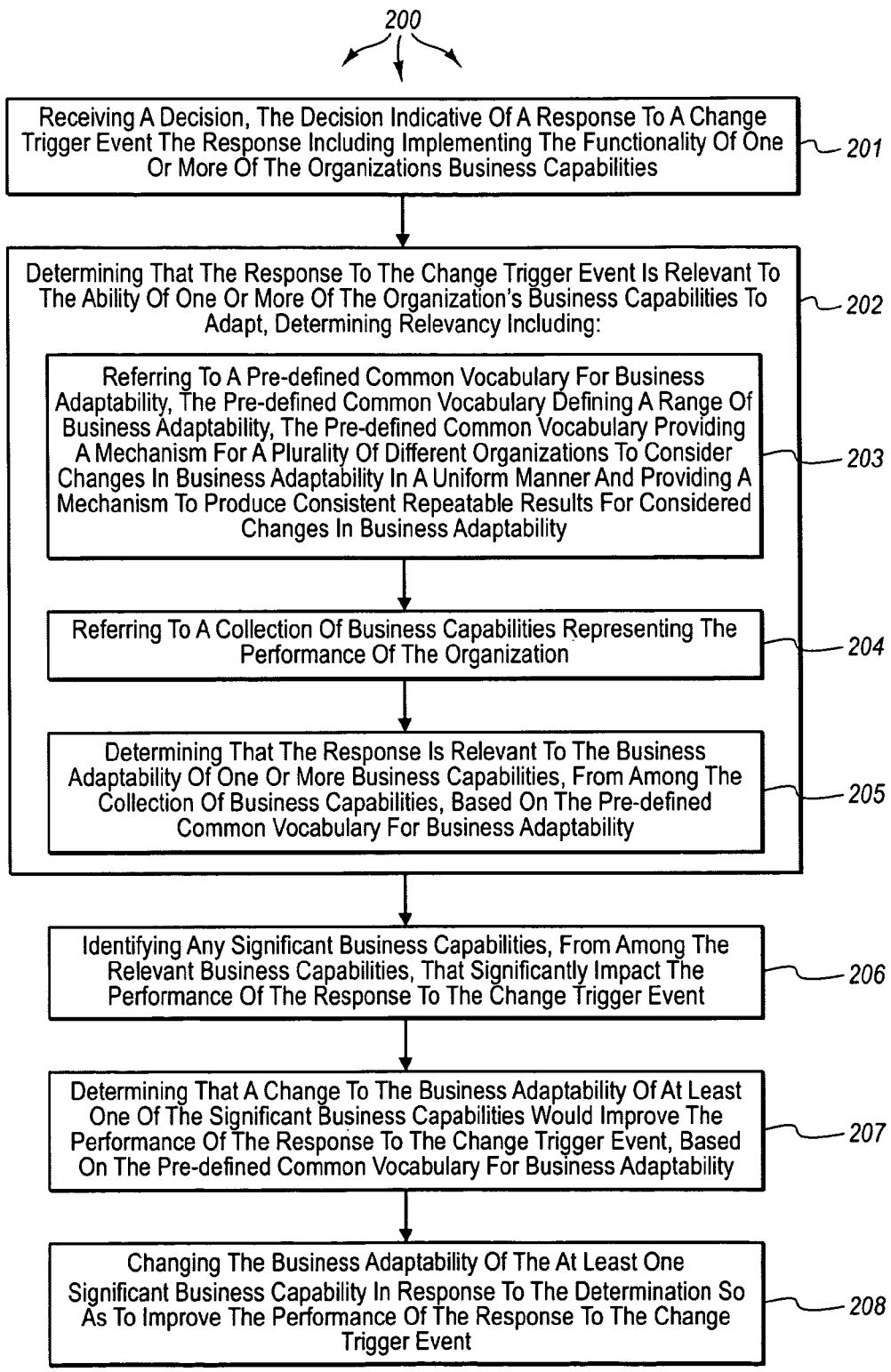
FIG. 2 illustrates a flow chart of an example method for implementing a structured change to the business adaptability of some aspect of an organization.

FIG. 2 illustrates a flow chart of an example method 200 for implementing a structured change to the business adaptability of some aspect of an organization. Method 200 will be described with respect to the components and data in computer architecture 100.

Method 200 includes an act of receiving a decision, the decision indicative of a response to a change trigger event, the response including implementing the functionality of one or more of the organizations business capabilities (act 201). For example, relevancy module 101 can receive decision 111. Decision 111 can be a real or simulated decision indicating how to respond to any of a variety of different change trigger events, such as, for example, an external or internal exception or variance to existing business expectations, metrics, or plans (reactive) or from of a course of business (proactive). For example, a decision maker at an organization can select decision 111 to implement a response, from among a plurality of possible responses, for responding an actual change trigger event. Alternately, decision 111 can be a simulated decision for responding to a change trigger event to simulate an organizational response.

Method 200 includes an act of determining that the response to the change trigger event is relevant to the ability of one or more of the organization's business capabilities to adapt (act 202). For example, relevancy module 101 can determine that decision 111 is relevant to the ability of relevant business capabilities 112 to adapt.

Determining relevancy includes an act of referring to a pre-defined common vocabulary for business adaptability, the pre-defined common vocabulary defining a range of business adaptability, the pre-defined common vocabulary providing a mechanism for a plurality of different organizations to consider changes in business adaptability in a uniform manner and providing a mechanism to produce consistent repeatable results for considered changes in business adaptability (act 203). For example, relevancy module 101 can refer to business adaptability vocabulary 121, including adaptability spectrum 122 and adaptability changes 123. Adaptability spectrum 122 can define a range of adaptability, such as, for example, as depicted in adaptability spectrum 400.

Determining relevancy also includes an act of referring to a collection of business capabilities representing the performance of the organization (act 204). For example, relevancy module 101 can refer to business capability collection 124. Business capability collection 124 can be a model representing the performance of organization 190.

Determining relevancy also includes determining that the response is relevant to the business adaptability of one or more business capabilities, from among the collection of business capabilities, based on the pre-defined common vocabulary for business adaptability (act 205). For example, relevancy module 101 can determine that the response to decision 111 is relevant to relevant business capabilities 112 (a subset of business capability collection 124) based on business adaptability vocabulary 121.

Method 200 includes an act of identifying any significant business capabilities, from among the relevant business capabilities, that significantly impact the performance of the response to the change trigger event (act 206). For example, significance module 102 utilizes impact thresholds 126 to identify significant business capabilities 113 from relevant business capabilities 112. Relevant business capabilities 112 that satisfy impact thresholds 126 are included in significant business capabilities 113. Thus, in some embodiments, a change in adaptability is considered (potentially only) for capabilities that are relevant to responding to a change trigger event and that significantly impact an organizations performance. Accordingly, resources are not expended to evaluate capabilities that, while relevant, do not significantly impact an organizations response to a change trigger event.

Method 200 includes an act of determining that a change to the business adaptability of at least one of the significant business capabilities would improve the performance of the response to the change trigger event, based on the pre-defined common vocabulary for business adaptability (act 207). For example, performance evaluator 104 can determine that an adaptability change to business capability 191 would improve organization 190's response to change trigger event. Performance evaluator 104 can refer to adaptability changes 123 to generate potential adaptability changes to significant business capabilities 113.

Within adaptability spectrum 122 it may be that business capability 191 is currently defined as flexible. Thus, performance evaluator 104 can refer to adaptability changes 123 to generate a proposed adaptability change from flexible to agile for business capability 191. For example, performance evaluator 104 can generate details describing how to create an agile version of business capability 191. Comparison module 131 can compare the performance of (flexible) business capability 190 to the agile version of business capability 190. Comparison module 131 can determine the change in performance between business capability 190 and the agile version of business capability 190. If the agile version of business capability 190 would not increase performance, refinements to business capability collection 124 are not implemented.

Similarly, performance evaluator 104 can refer to adaptability changes 123 to generate a proposed adaptability change from flexible to consistent/durable for business capability 191. For example, performance evaluator can generate a consistent/durable version of business of capability 190.

Comparison module 131 can compare the performance of (flexible) business capability 190 to the consistent/durable version of business capability 190. Comparison module 131 can determine the change in performance between business capability 190 and the consistent/durable version of business capability 190. If the consistent/durable version of business capability 190 would not increase performance, refinements to business capability collection 124 are not implemented.

On the other hand, if a proposed change (e.g., increase or decrease) in adaptability of business capability 190 would increase performance, refinement module 132 (e.g., a modeling application component) can generate model refinements for business capability collection 124. Method 200 includes an act of changing the business adaptability of the at least one significant business capability in response to the determination so as to improve the response to the change trigger event (act 208). For example, performance evaluator 104 can integrate business adaptability change 114 into business capability collection 124 to change the adaptability of business capability 190 within business capability collection 124. Business adaptability change 114 can represent an increase or a decrease in the adaptability of business capability 191. Business adaptability change 114 can address an exception or variance relative to existing business expectations, metrics, or plans indicated in decision 111 or can be a proactive change prior to the occurrence of any exceptions or variance.

Thus, generally an organization's business capabilities utilized to implement a response can be analyzed and potential increases and/or decreases in business capability adaptability can be implemented. Embodiments of the invention can be used to analyze and evaluate an actual response to an actual change trigger event. Based on analysis and evaluation of an actual response, increases and/or decreases in business capability adaptability can be implemented to improve the response in the future. Embodiments of the invention can also be used to analyze and evaluate a response to a simulated change trigger event. Thus, simulations can also be used to improve responses to actual change trigger events should they occur. For example, business capabilities can be changed to increase or decrease adaptability to provide more appropriate responses to actual change trigger events based on the results of a simulation.

Further, a pre-defined business adaptability vocabulary provides a mechanism for any organization to consider changes in business adaptability to a business capability collection in a uniform manner. For example, business adaptability vocabulary 121 provides a mechanism for organization 190 or any other organization to consider changes in business adaptability to business capability collection 124 in a uniform manner. Further, a pre-defined business adaptability vocabulary provides a mechanism to produce consistent repeatable results for considered adaptability changes to a business capability collection. For example, business adaptability vocabulary 121 provides a mechanism to produce consistent repeatable results for considered adaptability changes to business capability collection 124. Thus, for example, a prospective purchaser or investor of organization 190 can more easily verify that (potentially costly) adaptability changes would in fact increase performance of organization 190.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. In a computer architecture including at least one processor, a method, performed by the at least one processor, for determining whether a change should be made to the adaptability of a business capability, the method comprising:

an act, performed by the at least one processor, of receiving a business capability for a first organization, wherein the business capability has an associated adaptability indicating the business capability's ability to adapt, the adaptability being defined according to a common vocabulary for business capability adaptability that is employed by a plurality of organizations to represent the adaptability of a business capability of each organization, the common vocabulary comprising an adaptability spectrum that defines a range of business adaptability including a first adaptability that indicates that the corresponding business capability is ready to adapt to changing requirements within specified time constraints, a second adaptability that indicates that the corresponding business capability is ready to adapt to changing requirements, and a third adaptability that indicates that the corresponding capability is not ready to adapt to changing requirements;

an act, performed by the at least one processor, of determining that the performance of the received business capability can be improved by changing the adaptability of the business capability, including:

comparing the performance of the received business capability to one or more performances of one or more different versions of the received business capability, the received business capability having an associated adaptability from the adaptability spectrum that is different than the adaptability associated with the received business capability, wherein at least one of the different versions of the received business capability is a business capability from a second organization that uses the common vocabulary to define the business adaptability of at least one of the different versions; and identifying that a first of the different versions of the received business capability would provide better performance than the received business capability; and an act, performed by the at least one processor, of applying one or more defined adaptability changes to the received business capability to change the adaptability of the received business capability in accordance with the adaptability of the first of the different versions of the received business capability.

2. The method as recited in claim 1, wherein the received business capability is received in response to receiving an external exception or variance relative to existing business expectations, metrics, or plans from an external organization.

3. The method as recited in claim 1, wherein the received business capability is received in response to receiving an internal exception or variance relative to existing business expectations, metrics, or plans from within the organization.

4. The method as recited in claim 1, wherein the received business capability is received in response to receiving a change trigger event in the course of business for the organization.

5. The method of claim 1, wherein the received business capability is selected from among a plurality of business capabilities of the organization.

6. The method as recited in claim 1, wherein the received business capability is received in response to receiving a decision for responding to an external exception or variance relative to existing business expectations, metrics, or plans from an external organization.

7. The method as recited in claim 1, wherein the received business capability is received in response to receiving a decision for responding to an internal exception or variance relative to existing business expectations, metrics, or plans from within the organization.

8. The method as recited in claim 1, wherein the business capability is received in response to receiving a decision for responding to a change trigger event from normal operations of a course of business for the organization.

9. The method as recited in claim 1, wherein the first adaptability is agile, the second adaptability is flexible, and the third adaptability is constant/durable.

10. The method as recited in claim 5, wherein the received business capability is selected from among a plurality of business capabilities of the organization based on a determination that the business capability satisfies an impact threshold.

11. The method as recited in claim 5, wherein the received business capability is a core business capability of the organization.

12. The method as recited in claim 5, wherein applying one or more defined adaptability changes to the received business capability to change the adaptability of the received business capability in accordance with the first of the different versions of the received business capability comprises increasing the adaptability of the received business capability.

13. The method as recited in claim 5, wherein applying one or more defined adaptability changes to the received business capability to change the adaptability of the received business capability in accordance with the first of the different versions of the received business capability comprises decreasing the adaptability of the received business capability.

14. A system, the system comprising:
one or more processors;
system memory; and
one or more computer-readable media having stored thereon computer-executable instructions representing a decision making entity and one of more adaptability change modules configured to change the adaptability of business capabilities, the decision making entity configured to:
receive a business capability for a first organization, wherein the business capability has an associated adaptability indicating the business capability's ability to adapt, the adaptability being defined according to a common vocabulary for business capability adaptability that is employed by a plurality of organizations to represent the adaptability of a business capability of each organization, the common vocabulary comprising an adaptability spectrum that defines a range of business adaptability including a first adaptability that indicates that the corresponding business capability is ready to adapt to changing requirements within specified time constraints, a second adaptability that indicates that the corresponding business capability is ready to adapt to changing requirements, and a third adaptability that indicates that the corresponding capability is not ready to adapt to changing requirements;
determine that the performance of the received business capability can be improved by changing the adaptability of the business capability, including:
comparing the performance of the received business capability to one or more performances one or more different versions of the received business capability, the received business capability having an associated adaptability from the adaptability spectrum that is different than the adaptability associated with the received business capability, wherein at least one of the different versions of the received business capability is a business capability from a second organization that uses the common vocabulary to define the business adaptability of at least one of the different versions; and
identifying that a first of the different versions of the received business capability would provide better performance than the received business capability; and
apply one or more defined adaptability changes to the received business capability to change the adaptability of the received business capability in accordance with the adaptability of the first of the different versions of the received business capability.

* * * * *